United States Patent
Kim et al.

(10) Patent No.: US 9,207,065 B2
(45) Date of Patent: Dec. 8, 2015

(54) DEPTH SENSING APPARATUS AND METHOD

(75) Inventors: Seong-Jin Kim, Hwaseong-si (KR); Sang-Wook Han, Yangcheon-gu (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 426 days.

(21) Appl. No.: 13/137,059

(22) Filed: Jul. 18, 2011

(65) Prior Publication Data
US 2012/0059625 A1 Mar. 8, 2012

(30) Foreign Application Priority Data
Sep. 8, 2010 (KR) .................. 10-2010-0088026

(51) Int. Cl.
| | | |
|---|---|---|
| G01B 11/14 | (2006.01) | |
| G01B 11/02 | (2006.01) | |
| G01B 21/04 | (2006.01) | |
| G01S 17/89 | (2006.01) | |
| G01S 7/486 | (2006.01) | |

(52) U.S. Cl.
CPC ............ *G01B 11/026* (2013.01); *G01B 21/045* (2013.01); *G01S 7/4863* (2013.01); *G01S 17/89* (2013.01)

(58) Field of Classification Search
CPC ....... G01B 11/26; H04N 5/335; H04N 5/378; H03M 3/474; H03M 1/12
USPC ............................ 702/159; 73/1.79; 356/3.02
See application file for complete search history.

(56) References Cited

U.S. PATENT DOCUMENTS

| | | | | |
|---|---|---|---|---|
| 6,393,377 | B1 * | 5/2002 | Shirai et al. ................... | 702/159 |
| 6,415,241 | B1 * | 7/2002 | Yoshida ........................ | 702/159 |
| 7,671,391 | B2 * | 3/2010 | Kawahito ..................... | 257/290 |
| 8,326,571 | B2 * | 12/2012 | Nagase .......................... | 702/159 |
| 2008/0258044 | A1 * | 10/2008 | Schrey et al. ............... | 250/208.1 |
| 2009/0244514 | A1 * | 10/2009 | Jin et al. ....................... | 356/4.01 |
| 2010/0042362 | A1 * | 2/2010 | Levesque et al. ............. | 702/159 |
| 2010/0141821 | A1 * | 6/2010 | Fossum et al. ................ | 348/308 |
| 2010/0153062 | A1 * | 6/2010 | Maltseff ........................ | 702/159 |
| 2010/0208114 | A1 * | 8/2010 | Kwon et al. ................... | 348/308 |
| 2011/0037969 | A1 * | 2/2011 | Spickermann et al. ....... | 356/5.01 |
| 2011/0051119 | A1 * | 3/2011 | Min et al. ...................... | 356/5.1 |

FOREIGN PATENT DOCUMENTS

| | | |
|---|---|---|
| JP | 2008-128792 | 6/2008 |
| JP | 2009-218682 | 9/2009 |
| JP | 2009-267971 | 11/2009 |
| JP | 2010-109893 | 5/2010 |

(Continued)

*Primary Examiner* — Mohamed Charioui
*Assistant Examiner* — Ruihua Zhang
(74) *Attorney, Agent, or Firm* — Harness, Dickey & Pierce, P.L.C.

(57) ABSTRACT

A depth sensing apparatus is provided. The depth sensing apparatus may reset, to a reference voltage value, a voltage of each of a first floating diffusion node and a second floating diffusion node of a sensor pixel for a first time period. For a second time period, the depth sensing apparatus may control the first floating diffusion node to store a voltage of a photodiode in a first phase interval, and may control the second floating diffusion node to store the voltage of the photodiode in a second phase interval. The depth sensing apparatus may calculate a difference between the voltage of the first floating diffusion node and the voltage of the second floating diffusion node for a third time period.

20 Claims, 11 Drawing Sheets

(56) References Cited

FOREIGN PATENT DOCUMENTS

| | | |
|---|---|---|
| JP | 2010-114487 | 5/2010 |
| KR | 2002-0067032 | 8/2002 |
| KR | 10-2007-0118299 | 12/2007 |
| KR | 10-2009-0097416 | 9/2009 |
| KR | 10-2010-0011676 | 2/2010 |
| KR | 10-2010-0018586 | 2/2010 |

* cited by examiner

DEPTH SENSING APPARATUS AND METHOD

CROSS-REFERENCE TO RELATED APPLICATIONS

This application claims the priority benefit of Korean Patent Application No. 10-2010-0088026, filed on Sep. 8, 2010, in the Korean Intellectual Property Office, the disclosure of which is incorporated herein by reference.

BACKGROUND

1. Field

One or more example embodiments of the present disclosure relate to a depth sensing apparatus and method that may acquire a depth image of a target object, and more particularly, to a depth sensing apparatus and method that may overcome an error in sensing a depth value occurring due to background light of an object.

2. Description of the Related Art

A method of obtaining distance information from a sensor to an object may generally be classified into an active method and a passive method.

The passive method may be configured by a stereo camera according to a scheme of calculating a distance from an object using only image information instead of emitting light.

The active method may be configured according to a triangulation scheme of calculating a distance using a time of flight (TOF) and a triangulation. The TOF may measure a travel time of light by emitting the light towards an object and sensing the light reflected from the object, and the triangulation may sense a position of reflected light, the light being emitted by a laser positioned within a predetermined distance from a sensor.

In the case of the active method, since the light is directly emitted, it is possible to acquire a distance value in all the pixels of a sensor and thus, it is possible to provide a dense depth map. However, when background light is strong, distortion may occur in a depth value because both the emitted light and the background light enter the sensor.

In addition, in the case of the active method, an error may occur. For example, since a pixel is saturated due to the background light, an accurate depth value may not be obtained.

SUMMARY

The foregoing and/or other aspects are achieved by providing a depth sensing apparatus, including a controller to reset, to a reference voltage value, a voltage of each of a first floating diffusion node and a second floating diffusion node of a sensor pixel for a first time period, to control the first floating diffusion node to store a voltage of a photodiode in a first phase interval for a second time period, and to control the second floating diffusion node to store the voltage of the photodiode in a second phase interval for the second time period, and a calculator to calculate a difference between the voltage of the first floating diffusion node and the voltage of the second floating diffusion node for a third time period.

For the first time period, the controller may reset, to the reference voltage value, the voltage of each of the first floating diffusion node and the second floating diffusion node by shorting an output node of a correlated double sampling (CDS) amplifier of a sensor column from the first floating diffusion node and the second floating diffusion node.

For the second time period, the controller may adjust a length of the second time period so that the first floating diffusion node and the second floating diffusion node are not saturated.

For the third time period, the controller may store the voltage of the first floating diffusion node in a sampling capacitor in a state where a CDS amplifier of a sensor column is reset, and then store the voltage of the second floating diffusion node in the sampling capacitor in a state where the CDS amplifier is not reset.

The calculator may calculate the difference between the voltage of the first floating diffusion node and the voltage of the second floating diffusion node using a voltage feedback from the CDS amplifier, after the voltage of the second floating diffusion node is stored in the sampling capacitor by the controller.

When the calculator calculates the difference between the voltage of the first floating diffusion node and the voltage of the second floating diffusion node, an effect of background light received by the photodiode for the second time period may be eliminated.

A difference between the first phase interval and the second phase interval may be set to be 180 degrees.

The photodiode may be configured as a pinned photodiode or a photogate.

The foregoing and/or other aspects are achieved by providing a depth sensing method, including resetting, to a reference voltage value, a voltage of each of a first floating diffusion node and a second floating diffusion node of a sensor pixel for a first time period, controlling the first floating diffusion node to store a voltage of a photodiode in a first phase interval for a second time period, and controlling the second floating diffusion node to store the voltage of the photodiode in a second phase interval for the second time period, and calculating a difference between the voltage of the first floating diffusion node and the voltage of the second floating diffusion node for a third time period.

The foregoing and/or other aspects are achieved by providing a depth camera having a depth sensing apparatus. The camera includes a light emitter to emit light according to a control signal, a sensor pixel including a photodiode, a first floating diffusion node and a second floating diffusion node, a controller to reset, to a reference voltage value, a voltage of each of the first floating diffusion node and the second floating diffusion node for a first time period, to control the first floating diffusion node to store a voltage of the photodiode in a first phase interval for a second time period, and to control the second floating diffusion node to store the voltage of the photodiode in a second phase interval for the second time period, and a calculator to calculate the depth value by calculating a difference between the voltage of the first floating diffusion node and the voltage of the second floating diffusion node for a third time period.

In the depth sensing camera, the first period, the second period, and the third period are consecutive and correspond respectively to a reset period, an integration period, and a reduction period.

In the depth sensing camera, a difference between the first phase interval and the second phase interval is 180 degrees and wherein after the reduction period is terminated, an output voltage is stored in the first floating diffusion node and the reference voltage value is stored in the second floating diffusion node.

The foregoing and/or other aspects are achieved by providing a depth sensing method in a depth sensing camera having a light emitter, a sensor pixel including a photodiode, a first floating diffusion node, a second floating diffusion node, and a controller. The depth sensing method includes resetting, for a first time period, a voltage of each of the first floating diffusion node and the second floating diffusion node, storing a voltage of the photodiode in a first phase interval in the first floating diffusion node for a second time period, storing the voltage of the photodiode in a second phase interval in the second floating diffusion node for the second time period, storing the voltage of the first floating diffusion node in a sampling capacitor for a first portion of a third time period, transferring the voltage of the first floating diffusion node to a feedback capacitor, storing the voltage of the second floating diffusion node in the sampling capacitor for a second portion of the third time period, and calculating a difference between the voltage of the first floating diffusion node and the voltage of the second floating diffusion node for the third time period, thereby eliminating an effect of background light received by the photodiode.

In the depth sensing method, the first period, the second period, and the third period are consecutive and correspond respectively to a reset period, an integration period, and a reduction period.

In the depth sensing method, a difference between the first phase interval and the second phase interval is 180 degrees and wherein after the reduction period is terminated, an output voltage is stored in the first floating diffusion node and the reference voltage value is stored in the second floating diffusion node.

The foregoing and/or other aspects are achieved by providing a depth camera having a depth sensing apparatus. The camera includes a light emitter to emit light according to a control signal, a sensor pixel including a photodiode, a first floating diffusion node and a second floating diffusion node, a controller to eliminate distortion of a depth value occurring due to background light by controlling timing of light emitted from the light emitter by way of the control signal to perform active depth sensing and to control the sensor pixel by storing voltages of the photodiode at different phase intervals and at different time periods in the first and second floating diffusion nodes, and a calculator to calculate the depth value by calculating a difference between a voltage of the first floating diffusion node and a voltage of the second floating diffusion node for a predetermined time period, thereby eliminating an effect of background light received by the photodiode.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
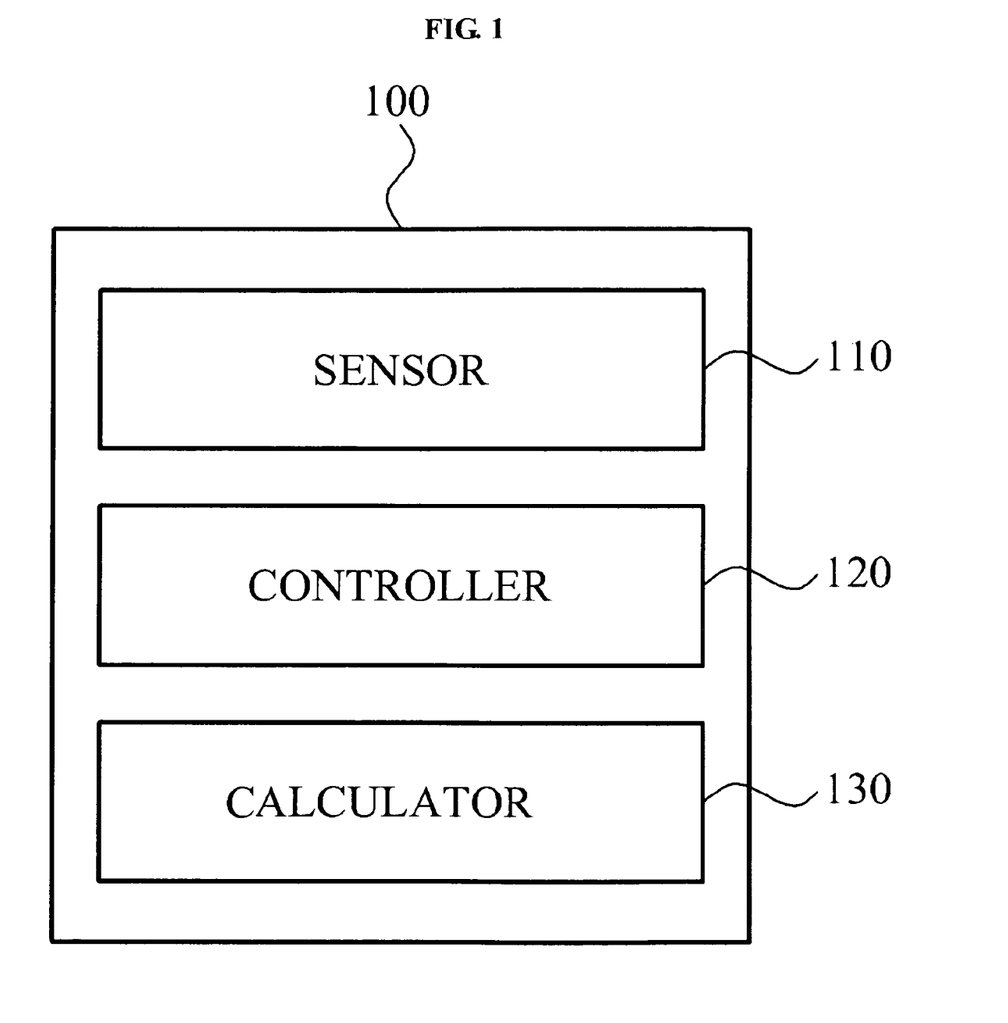
FIG. 1 illustrates a depth sensing apparatus according to example embodiments.

FIG. 1 illustrates a depth sensing apparatus 100 according to example embodiments.

The depth sensing apparatus 100 may include, for example, a sensor 110, a controller 120, and a calculator 130.

The sensor 110 may include a pixel having a photodiode to receive light, for example, an infrared (IR) ray and to generate a charge, and a column to read a pixel value of the pixel and to control the pixel.

A configuration of the pixel and the column within the sensor 110 will be further described below with reference to FIG. 3.

The controller 120 may perform a functionality of a light emitting diode (LED) driver by the control of timing for emitting light, for example, IR ray for active depth value sensing. The controller 120 may perform a functionality of a sensor controller that controls the pixel and the column by reading a charge of a floating diffusion node included in sensor pixels.

A process of the controller 120 driving light emission of an IR LED and controlling a sensor pixel will be further described below with reference to FIG. 4.

The calculator 130 may calculate a depth value of a portion where light is reflected based on a time of flight (TOF) according to an active method, that is, a distance between a depth camera and an object.

According to example embodiments, the controller 120 may eliminate distortion of a depth value occurring due to background light by controlling the pixel and the column within the sensor 110, and may thereby prevent pixel saturation. Accordingly, an accuracy of the depth value calculated by the calculator 130 may be significantly enhanced.

A process of calculating a depth value will be further described below with reference to Equation 1 through Equation 3, and FIG. 5 through FIG. 10.

Figure 2:
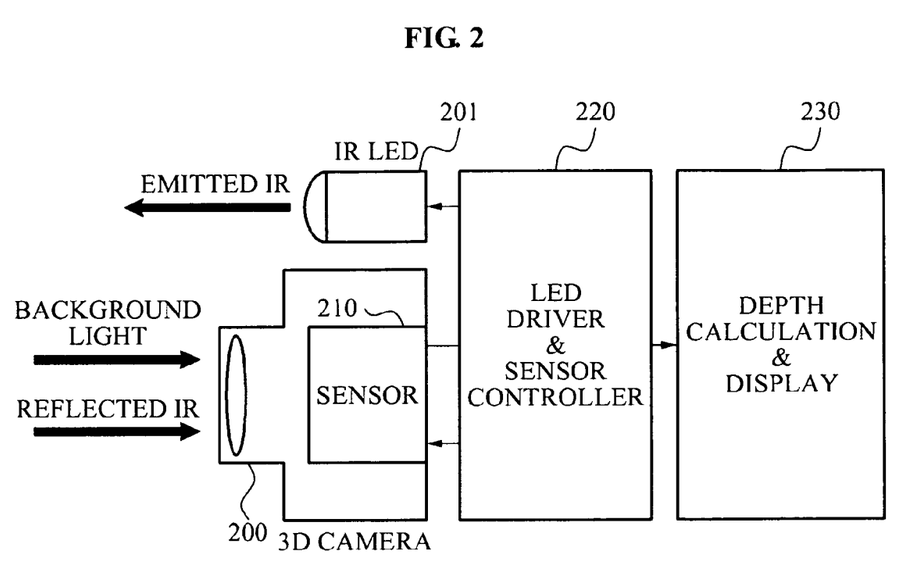
FIG. 2 illustrates a configuration of a depth camera set including a depth sensing apparatus according to example embodiments.

FIG. 2 illustrates a configuration of a depth camera set including a depth sensing apparatus according to example embodiments.

A depth camera 200 may include, for example, an IR LED 201 to emit an IR ray according to a control signal of a controller 220. The depth camera 200 may further include a sensor 210 to receive light, for example, the IR ray and the like, and to generate a charge.

The depth camera 200 may also include a calculator 230 to calculate a depth value using the charge generated by the sensor 210.

As shown in FIG. 2, the light received by the sensor 210 of the depth camera 200 may include a reflected IR, which is an IR emitted from the IR LED 201 and reflected from an object, and may also include background light that is generated by the object itself or is present due to other reasons.

Due to the background light, an error may occur in calculating the depth value.

Accordingly, a depth sensing apparatus and method according to example embodiments may eliminate an effect of the background light.

A depth sensing apparatus and method, according to example embodiments, may prevent a pixel within the sensor 210 from becoming saturated due to background light and reflected IR.

In general, a method of eliminating background light using an active depth camera of a time of flight (TOF) scheme may include a 4-phase scheme and a 2-phase scheme.

Hereinafter, it is assumed that a single photodiode and two floating diffusion nodes, for example, a first floating diffusion node and a second floating diffusion node are included in a single pixel of the sensor 210.

In the case of the 4-phase scheme, a voltage difference between zero degrees and 180 degrees may be obtained through a first measurement, and a voltage difference between 90 degrees and 270 degrees may be obtained through a second measurement, from emitted light, for example, by employing transistors TX0 and TX1 to perform an electric shutter functionality with respect to two floating diffusion nodes, respectively.

The 4-phase scheme may eliminate the background light using a difference between the above-measured voltage values and may calculate a depth value.

Since the same photodiode corresponds to a single pixel, an amount of charge occurring due to the background light may be the same even though signals having the voltage difference between zero degrees and 180 degrees are measured at each floating diffusion node.

When the voltage difference between zero degrees and 180 degrees and the voltage difference between 90 degrees and 270 degrees are obtained, the amount of charge occurring due to the background light may disappear, and a TOF may be calculated from a remaining amount of charge.

In the case of the 2-phase scheme, a voltage may be measured to generate a voltage difference between zero degrees and 180 degrees through the first measurement, and a voltage using a charge value generated by only an IR LED without emitting IR may be measured through the second measurement.

When the difference between the first measurement and the second measurement is used, a TOF between zero degrees and 180 degrees in which the background light is eliminated may be obtained.

Even though the depth value may be obtained by eliminating the background light using the above schemes, a saturation phenomenon may occur due to constraints on a well capacity of a charge storage node, for example, a floating diffusion node when the background light is strong.

In this example, a background light strength generated at each node may be different and thus, a depth may not be obtained. To prevent the above saturation phenomenon, a very large full well capacity may need to be provided. However, the providing of the very large full well capacity may indicate an increase in an area of a sensor circuit and thus, there are some constraints.

According to example embodiments, there may be provided a depth sensing apparatus and method that may eliminate the effect of background light, prevent the saturation phenomenon, and also maintain a circuit area.

A structure of the pixel and the column will be described with reference to FIG. 3 and a timing diagram for controlling the pixel and the column will be described with reference to FIG. 4.

Figure 3:
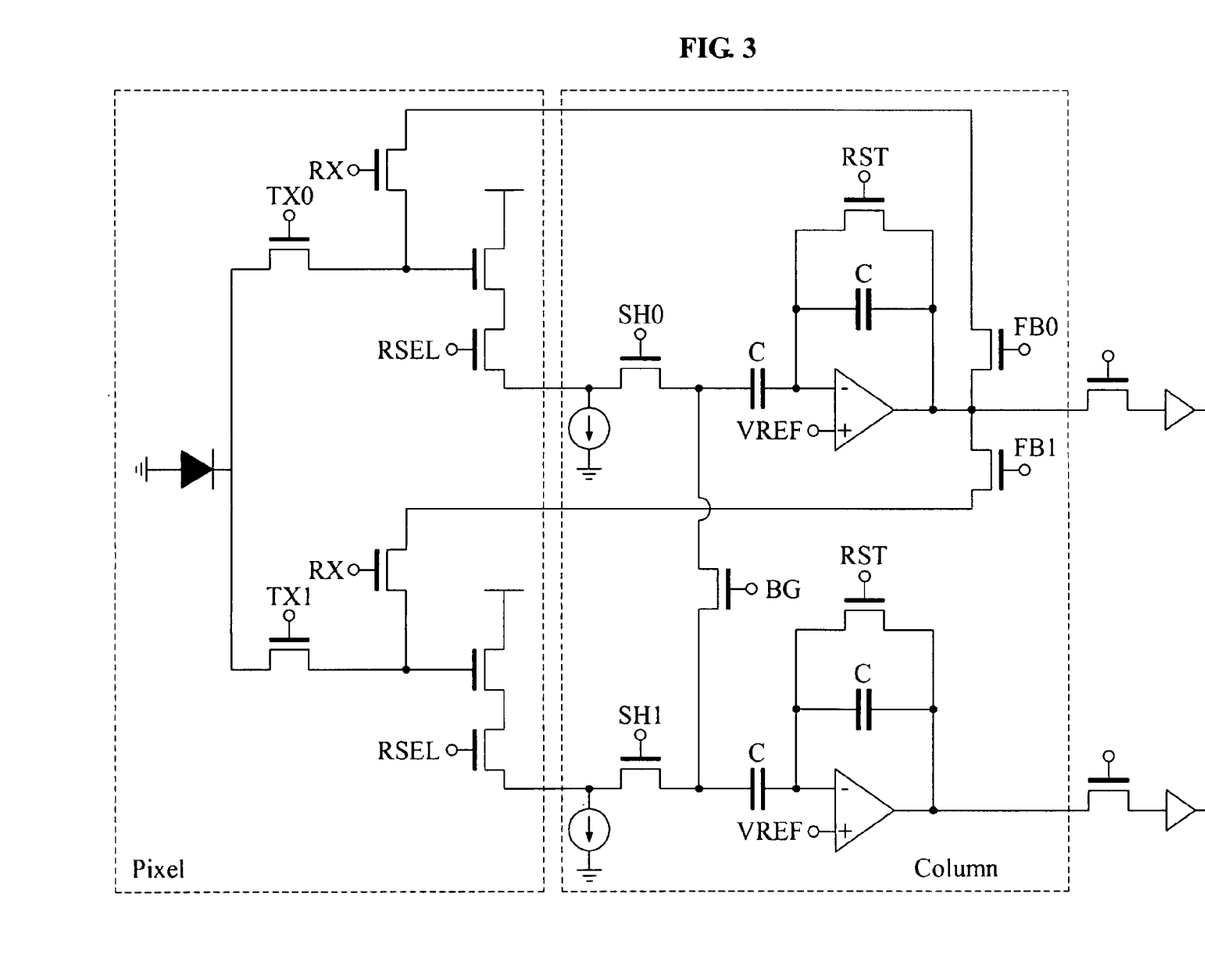
FIG. 3 illustrates a configuration of a depth sensing pixel and column unit driven by a depth sensing method according to example embodiments.

FIG. 3 illustrates a configuration of a depth sensing pixel and column unit driven by a depth sensing method according to example embodiments.

According to example embodiments, even though two storage nodes to store charge are illustrated in a single depth pixel in the form of floating diffusion nodes, three or more storage nodes may alternatively be provided.

A photodiode may be configured as a pinned-photodiode or a photogate, or the like.

In FIG. 3, the structure of the pixel and the column corresponds to an expanded structure of a general 4-transistor (T) color pixel.

In contrast with the conventional structure, in FIG. 3 a drain of a reset transistor, where a gate signal is RX, is not connected to a VDD and is instead connected to an output terminal of a correlated double sampling (CDS) amplifier within the column.

According to example embodiments, two CDS amplifier circuits are allocated within the column in correspondence to a single pixel. However, it is only an example and thus, only a single CDS amplifier circuit may be allocated.

A transistor driven by a BG signal (e.g., a signal whose voltage is decreased by the background light) may be disposed between column lines connected to both nodes.

Figure 4:
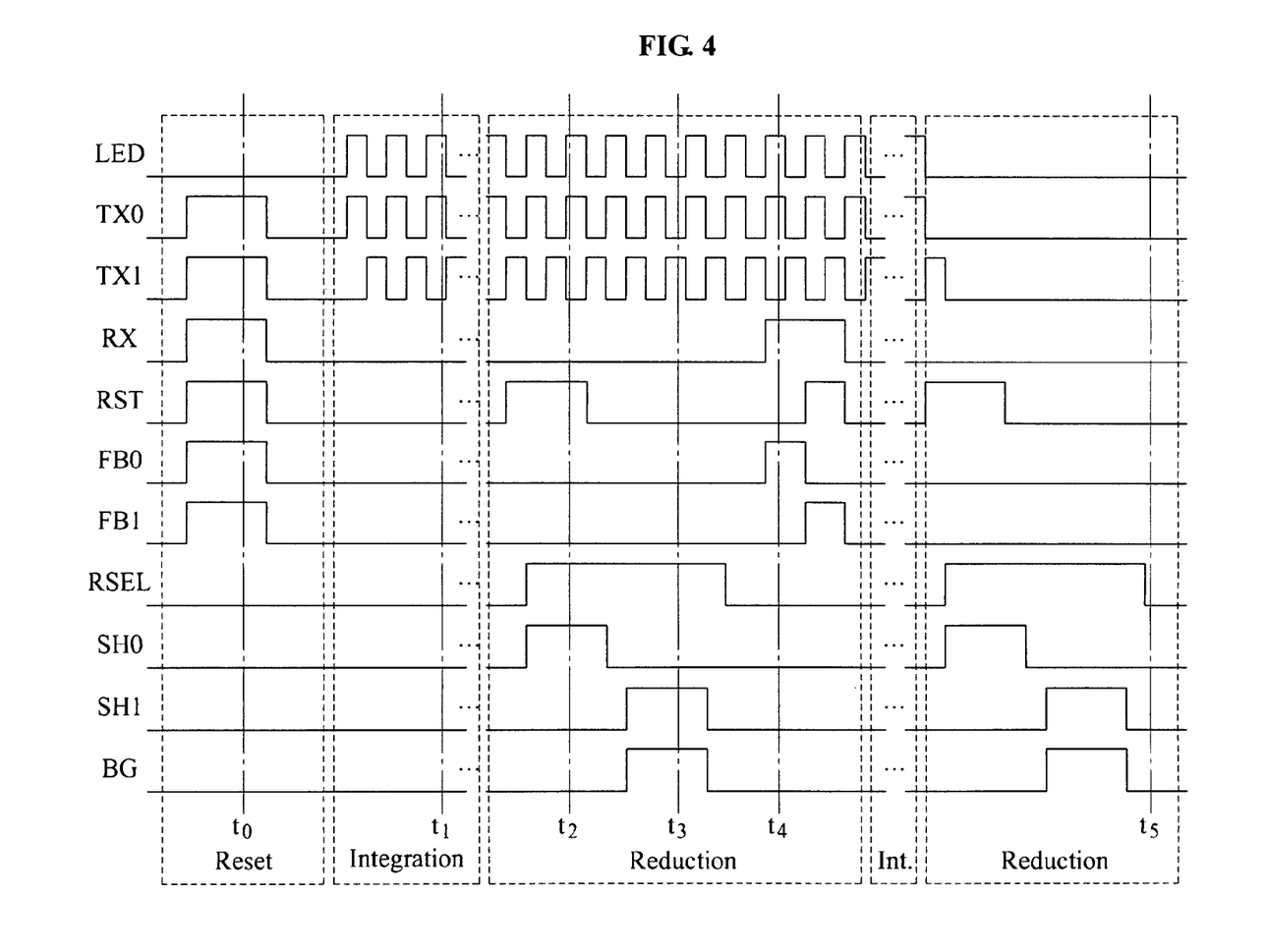
FIG. 4 illustrates a signal diagram of a controller of a depth sensing apparatus to control an infrared (IR) emitting diode (LED) and various types of transistors within a column or a pixel of FIG. 3 according to example embodiments.

FIG. 4 illustrates a signal diagram of the controller 120 of the depth sensing apparatus 100 to control an IR LED and various types of transistors within the column or the pixel of FIG. 3 according to example embodiments.

As shown in the timing diagram, the controller 120 may classify total control signals into three periods.

A first period corresponds to a reset period (hereinafter, also referred to as a "first time period"), a second period corresponds to an integration period (hereinafter, also referred to as a "second time period"), and a third period corresponds to a reduction period (hereinafter, also referred to as a "third time period").

Figure 5:
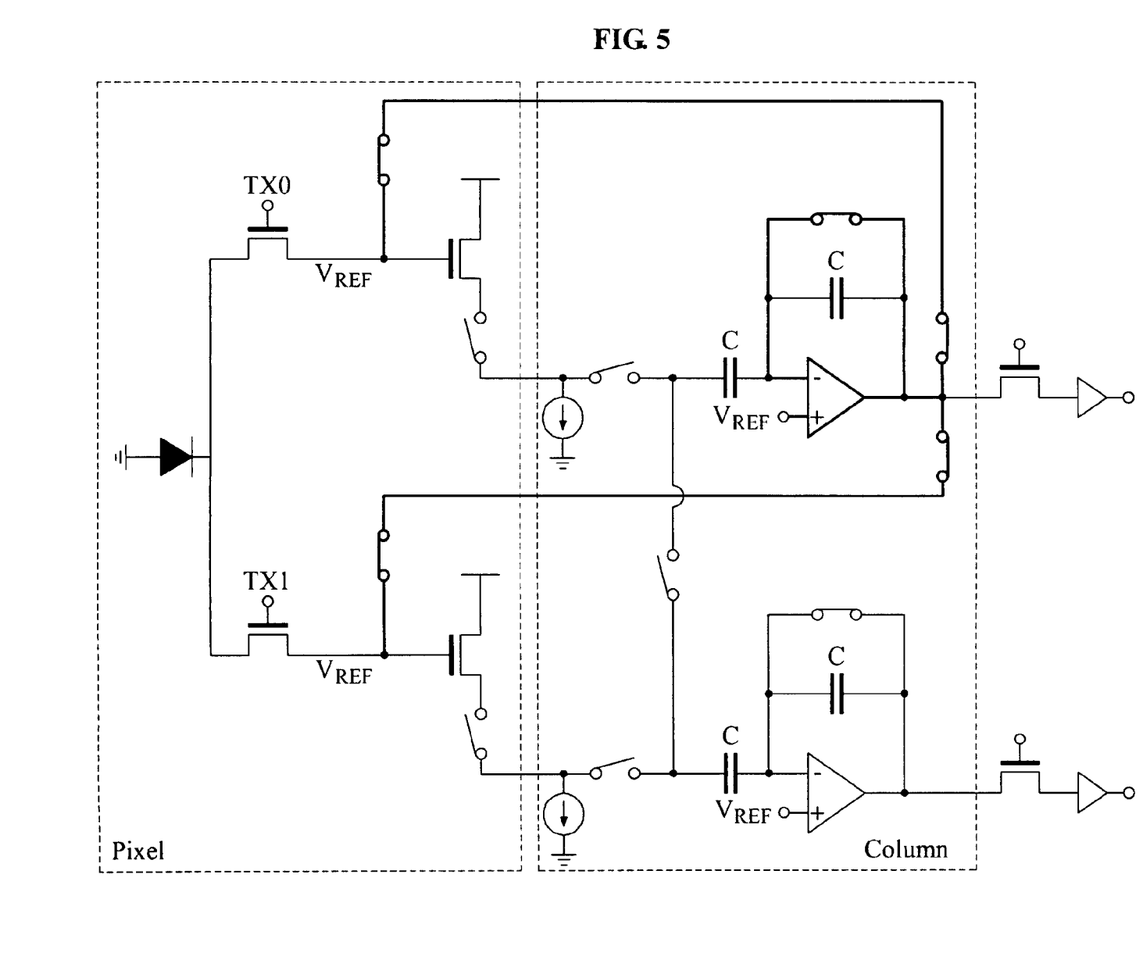
FIG. 5 illustrates a process of resetting floating diffusion nodes within a sensor pixel for a first time period by a depth sensing method according to example embodiments.

The circuit diagram of FIG. 3 in the reset period may be expressed as shown in FIG. 5.

FIG. 5 illustrates a process of resetting floating diffusion nodes within a sensor pixel for a first time period, that is, a reset period by a depth sensing method according to example embodiments.

For the reset period, floating diffusion nodes that are storage nodes on both sides of a pixel may be reset by a column amplifier by switching on TXn, RX, FBn, and RST signals.

In this example, since the RST signal of the CDS amplifier is on, an output signal may be $V_{REF}$ that is an input of a positive terminal and both floating diffusion nodes may be reset to $V_{REF}$.

When the reset period is terminated, an integration period may start. The circuit diagram of FIG. 3 in the integration period may be expressed as shown in FIG. 6.

Figure 6:
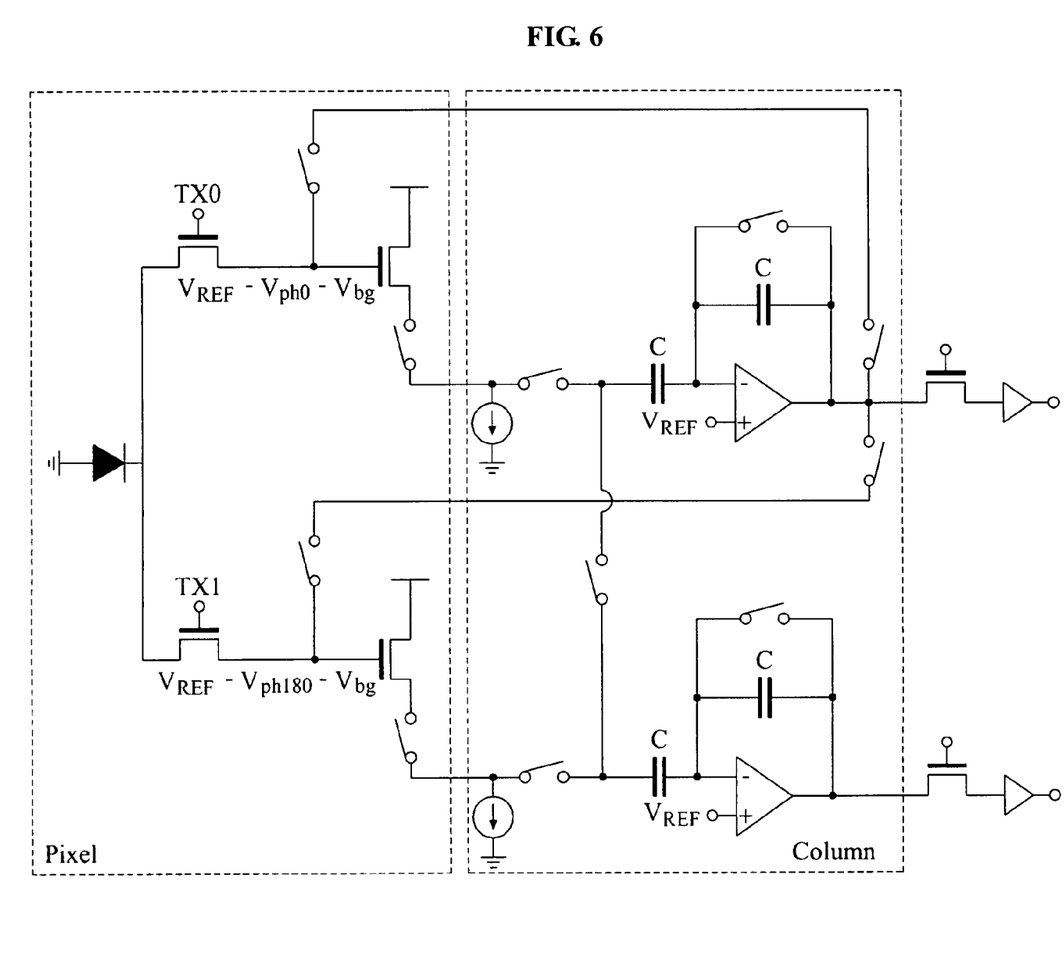
FIG. 6 illustrates a process of storing voltages of different phase intervals in floating diffusion nodes within a sensor pixel for a second time period by a depth sensing method according to example embodiments.

FIG. 6 illustrates a process of storing voltages of different phase intervals in floating diffusion nodes within a sensor pixel for a second time period, that is, an integration period by a depth sensing method according to example embodiments.

For the integration period, an LED signal may be modulated and thereby light is emitted. For matching synchronization with the modulated and emitted LED signal, TX0 and TX1 signals may be adjusted.

It can be known from FIG. 4 that TX0 has no phase difference with the LED signal and TX1 has a phase difference of 180 degrees with the LED signal, which is to measure a TOF.

An amount of time where light is reflected and is returned may differ depending on a distance from an object. Accordingly, voltages of both floating diffusion nodes may decrease due to a charge generated by light. When voltages decreased by the reflected light are $V_{ph0}$ and $V_{ph180}$, and a voltage decreased by the background light is $V_{bg}$, voltages of two floating diffusion nodes may be expressed by Equation 1 and Equation 2.

$$V_{FD0} = V_{REF} - V_{ph0} - V_{bg} \quad \text{[Equation 1]}$$

$$V_{FD1} = V_{REF} - V_{ph180} - V_{bg} \quad \text{[Equation 2]}$$

Due to a charge generated in a single photodiode, the voltages of the floating diffusion nodes may decrease and thus, the voltage decreased by the background light may be the same. The decreased voltage may be determined based on a distance from an object, an integration time, and a strength of light.

Accordingly, when the background light is strong, the voltage may significantly decrease and thus, the saturation phenomenon may occur. The controller 120 may prevent the saturation by appropriately adjusting the integration time.

A reduction period may start.

For the reduction period, the effect of background light may be eliminated in order to calculate a depth value. The circuit diagram of FIG. 3 in the reduction period may be expressed as shown in FIG. 7 and FIG. 8.

Figure 7:
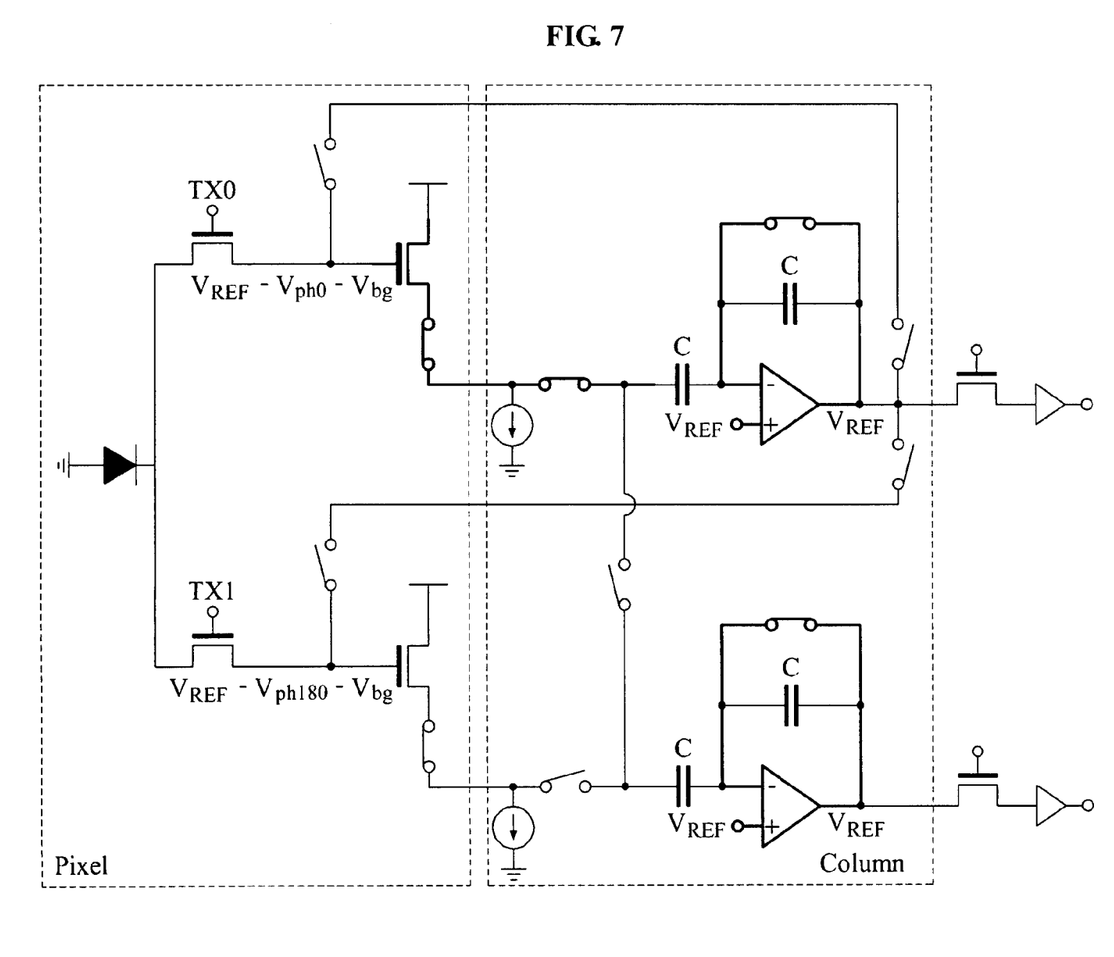
FIG. 7 illustrates a process of storing a voltage of a first floating diffusion node within a sensor pixel in a sampling capacitor for a first part of a third time period by a depth sensing method according to example embodiments.
Figure 8:
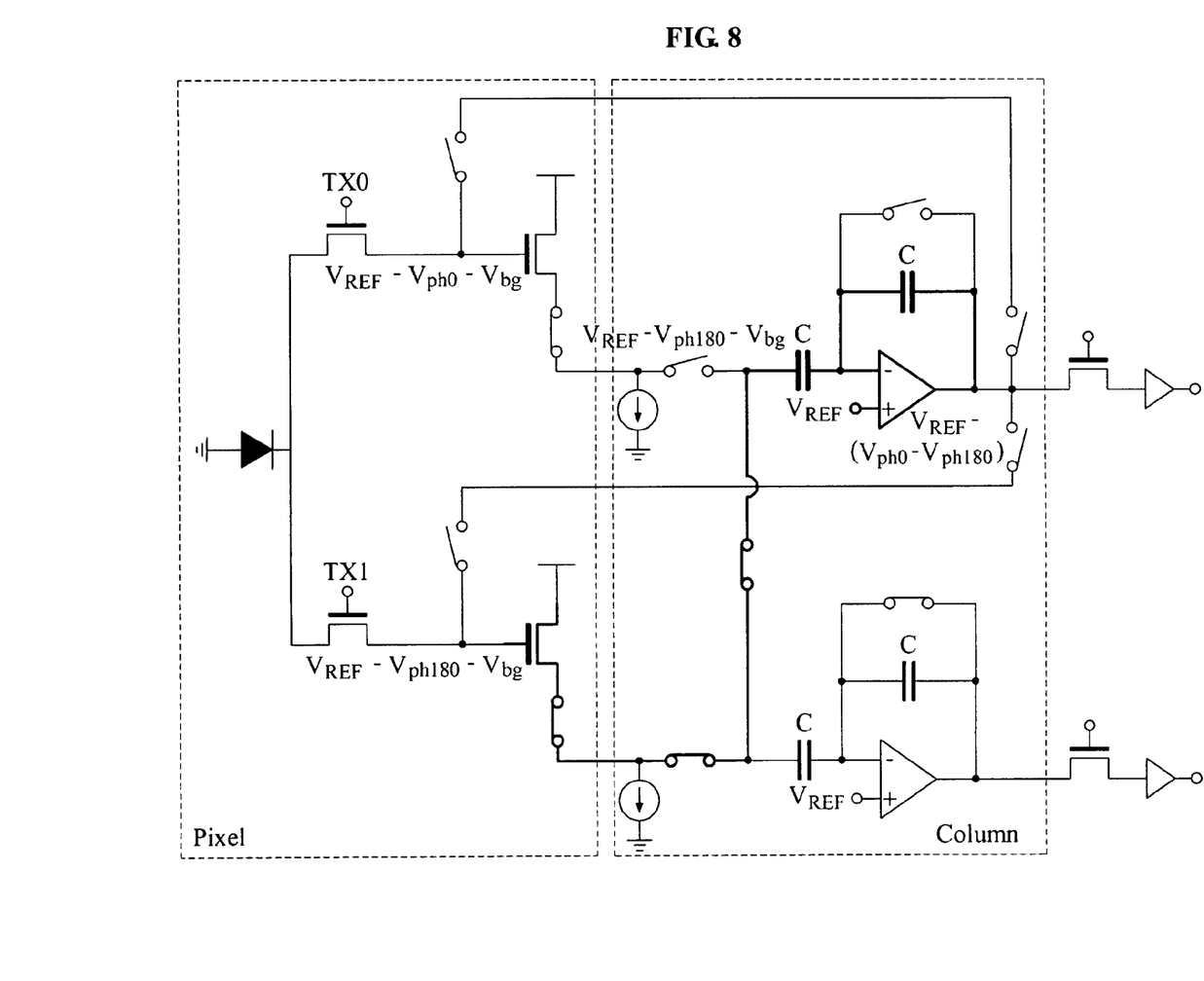
FIG. 8 illustrates a process of transferring the voltage of the first floating diffusion node to a feedback capacitor and then storing a voltage of a second floating diffusion node within the sensor pixel in the sampling capacitor for a latter part of the third time period by a depth sensing method according to example embodiments.

Referring again to the timing diagram of FIG. 4, a switch may be configured as shown in FIG. 7 and then may be configured as shown in FIG. 8.

FIG. 7 illustrates a process of storing a voltage of a first floating diffusion node within a sensor pixel in a sampling capacitor for a first part of a third time period, that is, a reduction period by a depth sensing method according to example embodiments.

As shown in the switch configuration of FIG. 7, after switching on an RST signal of a column amplifier, a voltage of a floating diffusion node storing a phase 0 signal may be read and the read voltage may be stored in the sampling capacitor.

FIG. 8 illustrates a process of transferring the voltage of the first floating diffusion node to a feedback capacitor and then storing a voltage of a second floating diffusion node within the sensor pixel in the sampling capacitor for a latter part of the third time period by a depth sensing method according to example embodiments.

As shown in the switch configuration of FIG. 8, after switching off the RST signal and switching on a BG signal, a phase 180 signal may be read and stored in the sampling capacitor.

Since an opposite side of the sampling capacitor is connected to a negative terminal of the column amplifier, a changed amount of charge of a capacitor may be transferred to the feedback capacitor and thus, an output voltage of the column amplifier may be expressed by Equation 3.

$$V_{CDSOUT} = V_{REF} + \begin{bmatrix} (V_{REF} - V_{ph0} - V_{bg}) - \\ (V_{REF} - V_{ph180} - V_{bg}) \end{bmatrix} \quad \text{[Equation 3]}$$
$$= V_{REF} - (V_{ph0} - V_{ph180})$$

As shown in Equation 3, an output voltage of an amplifier may be determined based on a difference between the phase 0 signal and the phase 180 signal.

For example, $V_{bg}$, that is the voltage decreased by the background light may disappear.

In this example, the depth sensing apparatus 100 may feed back the output voltage of the amplifier to a first floating diffusion node, and reset a voltage of a second floating diffusion node to $V_{REF}$ and then perform the aforementioned integration period and reduction period. FIG. 4 shows the aforementioned timing diagram.

Figure 9:
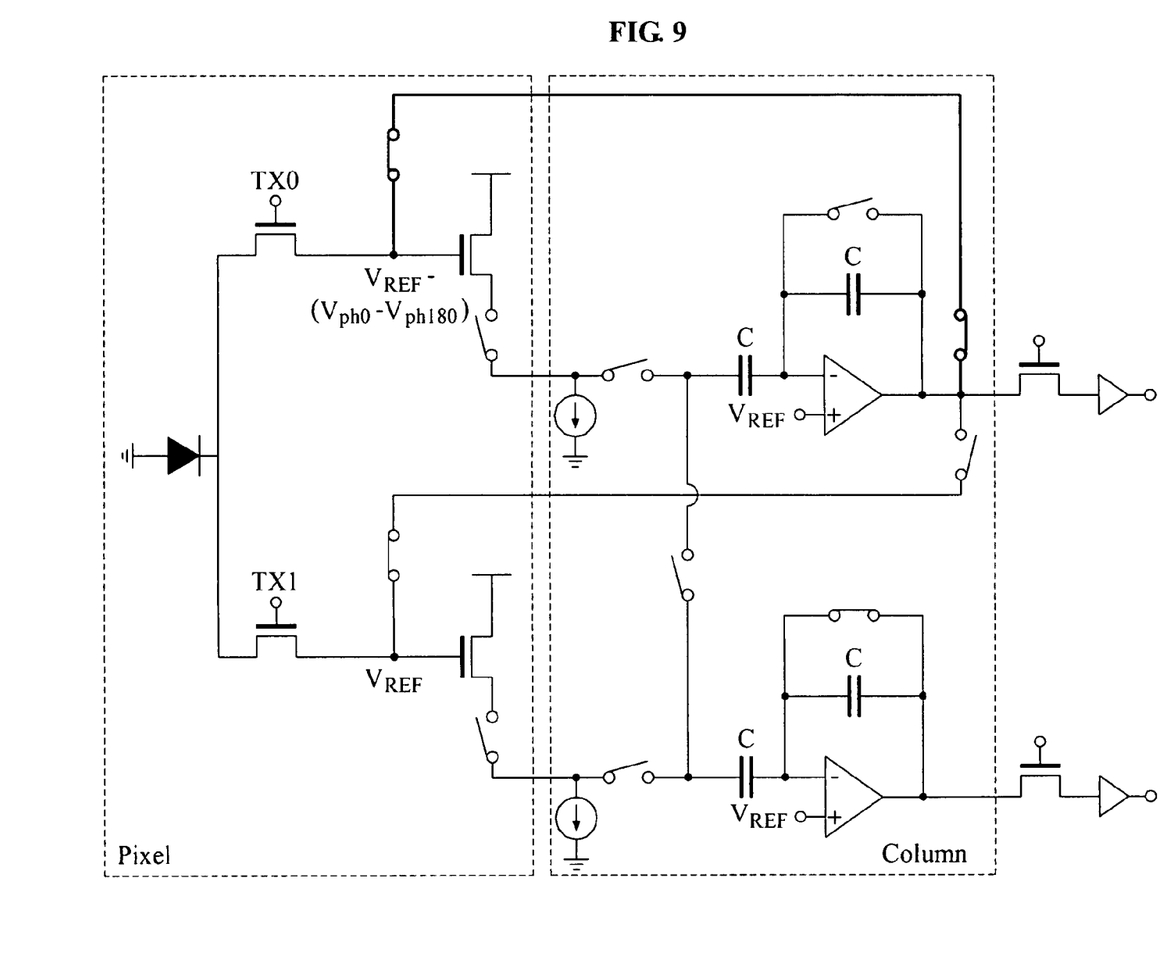
FIG. 9 illustrates a process of repeating the second time period after the third time period by a depth sensing method according to example embodiments.

A voltage level feedback or reset of the floating diffusion nodes in this example is shown in FIG. 9.

FIG. 9 illustrates a process of repeating the second time period after the third time period by a depth sensing method according to example embodiments.

After a reduction period is terminated, an output voltage may be stored via a reset transistor in the floating diffusion node where a phase 0 signal is stored, and a $V_{REF}$ value may be stored in a node where a phase 180 signal is stored.

The integration period and the reduction period may be repeated. For the integration period, voltages of both floating diffusion nodes may decrease due to light. For the reduction period, a difference between both values may be calculated and then a value may be stored through feedback.

Figure 10:
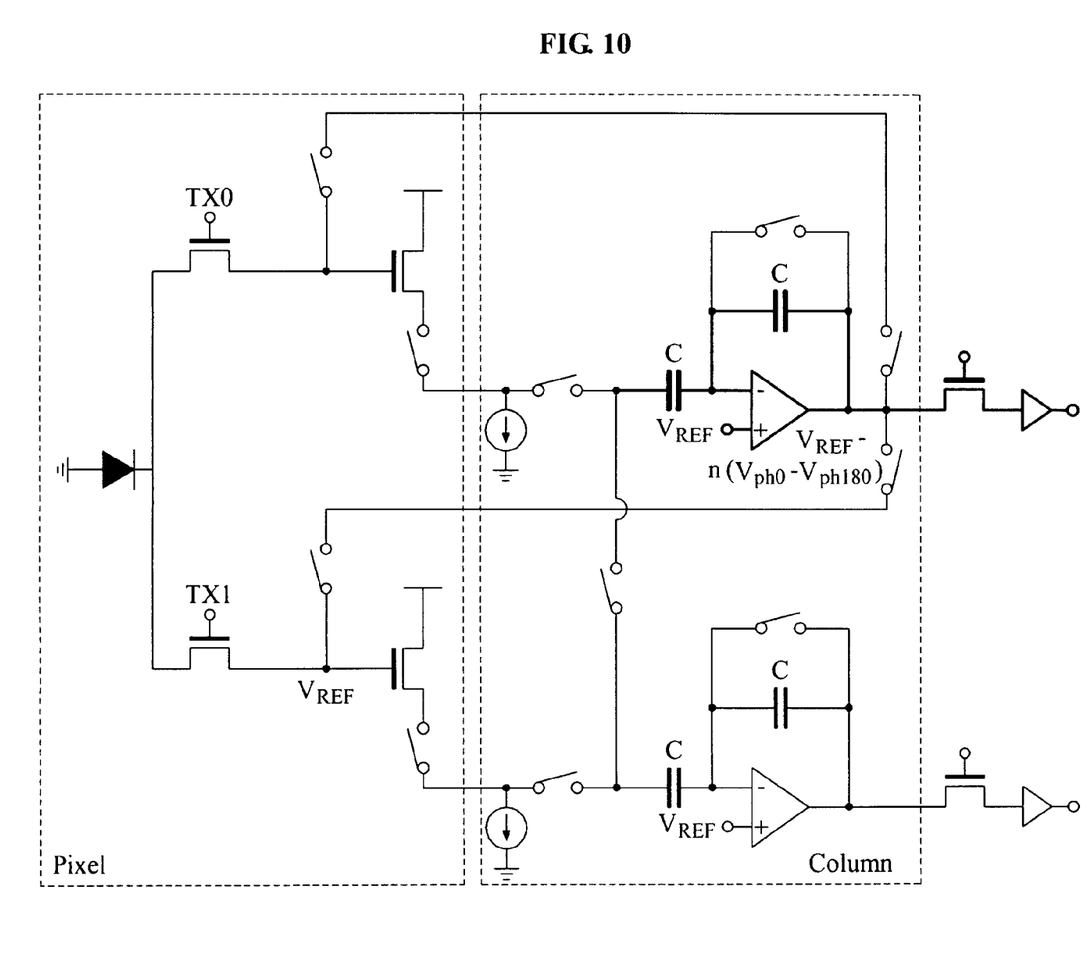
FIG. 10 illustrates a case where the second time period and the third time period are repeated n times by a depth sensing method according to example embodiments.

When repeating the above process n times, the output voltage of the column amplifier may be expressed by Equation 4.

$$V_{CDSOUT} = V_{REF} - n(V_{ph0} - V_{ph180}) \quad \text{[Equation 4]:}$$

FIG. 10 illustrates a case where the second time period and the third time period are repeated n times by a depth sensing method according to example embodiments.

Referring to FIG. 10, a difference between a phase 0 signal and a phase 180 signal is amplified n times and the effect of background light disappears. A $V_{REF}$ value is known and thus, may be easily subtracted. To calculate a depth value, a difference between LED and TXn signals may be obtained by adjusting phases of the LED and TXn signals to be 90 degrees and 270 degrees according to the aforementioned scheme, and the depth value may be obtained through the aforementioned 4-phase scheme.

According to example embodiments, the controller 120 may determine a number n of cycles based on the strength of background light and may also read values of the floating diffusion nodes for the second time period corresponding to the reduction period and compare comparator circuits and then determine whether to perform a background light elimination operation.

Accordingly, the depth sensing apparatus 100 may adaptively determine whether to perform the background light elimination operation according to a background light criterion based on a surrounding environment, and determine whether to perform the background light elimination operation by increasing sensitivity.

The depth sensing apparatus 100 may perform the background light elimination operation differently depending on a background light criterion for each pixel within a sensor.

A depth sensing apparatus and method according to example embodiments may eliminate a charge generated by a photodiode due to background light, using a reset transistor within a sensor pixel, a CDS amplifier circuit positioned within a column, and a BG transistor.

Accordingly, it is possible to prevent saturation of a depth sensing pixel and to acquire an accurate depth value. Accordingly, it is possible to acquire a depth image with an enhanced accuracy in both an indoor environment and an outdoor environment.

The aforementioned background light elimination and saturation prevention process according to example embodiments may be used for a depth sensor to measure only a depth value and a sensor to simultaneously measure a color value and a depth value.

Figure 11:
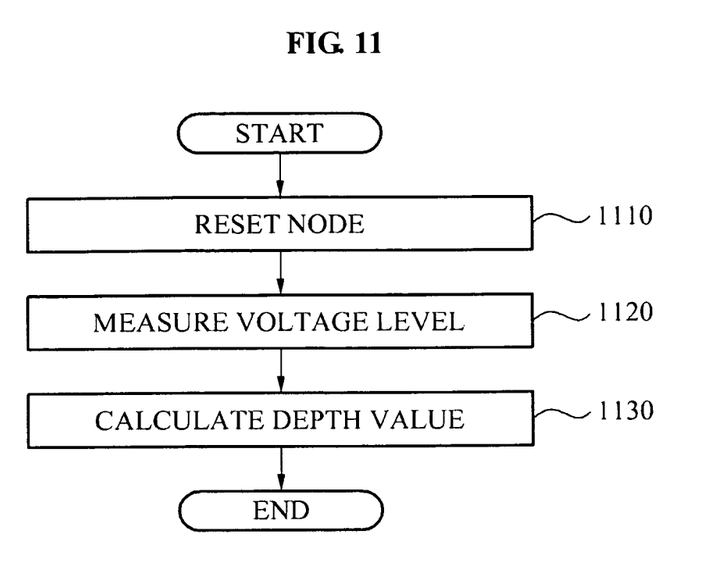
FIG. 11 illustrates a depth sensing method according to example embodiments.

FIG. 11 illustrates a depth sensing method according to example embodiments.

In operation 1110, the controller 120 may reset floating diffusion nodes within a sensor pixel. Operation 1110 may correspond to a reset period.

In operation 1120, the controller 120 may measure a voltage level through light reception. Operation 1120 may correspond to an integration period.

In operation 1130, the calculator 130 may calculate a difference between voltage levels of the floating diffusion nodes. Operation 1130 may correspond to a reduction period.

The above process may be repeated n times. The depth sensing method is described above with reference to FIG. 4 through FIG. 10.

The depth sensing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules or units described herein may be executed by a dedicated processor unique to that unit or by a processor common to one or more of the modules. The described methods may be executed on a general purpose computer or processor or may be executed on a particular machine such as the depth sensing apparatus described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A depth sensing apparatus, comprising:
    a controller to reset, to a reference voltage value, a voltage of each of a first floating diffusion node and a second floating diffusion node of a sensor pixel for a first time period, to control the first floating diffusion node to store a voltage of a photodiode in a first phase interval for a second time period, and to control the second floating diffusion node to store the voltage of the photodiode in a second phase interval for the second time period, wherein a difference between the first phase interval and the second phase interval is 180 degrees, and wherein, for the first time period, the controller resets, to the reference voltage value, the voltage of each of the first floating diffusion node and the second floating diffusion node by shorting an output node of a correlated double sampling (CDS) amplifier of a sensor column from the first floating diffusion node and the second floating diffusion node; and
    a calculator, using one or more processors, to calculate a difference between the voltage of the first floating diffusion node and the voltage of the second floating diffusion node for a third time period.

2. The depth sensing apparatus of claim 1, wherein, for the second time period, the controller adjusts a length of the second time period so that the first floating diffusion node and the second floating diffusion node are not saturated.

3. The depth sensing apparatus of claim 1, wherein, for the third time period, the controller stores the voltage of the first floating diffusion node in a sampling capacitor in a state in which a CDS amplifier of a sensor column is reset, and then stores the voltage of the second floating diffusion node in the sampling capacitor in a state in which the CDS amplifier is not reset.

4. The depth sensing apparatus of claim 3, wherein the calculator calculates the difference between the voltage of the first floating diffusion node and the voltage of the second floating diffusion node using a voltage feedback from the CDS amplifier, after the voltage of the second floating diffusion node is stored in the sampling capacitor by the controller.

5. The depth sensing apparatus of claim 4, wherein when the calculator calculates the difference between the voltage of the first floating diffusion node and the voltage of the second floating diffusion node, an effect of background light received by the photodiode for the second time period is eliminated.

6. The depth sensing apparatus of claim 1, wherein the photodiode is configured as a pinned photodiode or a photogate.

7. A depth sensing method that utilizes one or more processors, the method comprising:
    resetting, to a reference voltage value, a voltage of each of a first floating diffusion node and a second floating diffusion node of a sensor pixel for a first time period, wherein the resetting comprises resetting, to the reference voltage value, the voltage of each of the first floating diffusion node and the second floating diffusion node by shorting an output node of a correlated double sampling (CDS) amplifier of a sensor column from the first floating diffusion node and the second floating diffusion node for the first time period;
    controlling the first floating diffusion node to store a voltage of a photodiode in a first phase interval for a second time period, and controlling the second floating diffusion node to store the voltage of the photodiode in a second phase interval for the second time period wherein a difference between the first phase interval and the second phase interval is 180 degrees; and
    calculating, by the one or more processors, a difference between the voltage of the first floating diffusion node and the voltage of the second floating diffusion node for a third time period.

8. The depth sensing method of claim 7, further comprising:
adjusting a length of the second time period so that the first floating diffusion node and the second floating diffusion node for the second time period are not saturated.

9. The depth sensing method of claim 7, wherein the calculating comprises:
storing the voltage of the first floating diffusion node in a sampling capacitor in a state where a CDS amplifier of a sensor column is reset, for the third time period; and
storing the voltage of the second floating diffusion node in the sampling capacitor in a state where the CDS amplifier is not reset.

10. The depth sensing method of claim 9, wherein the calculating comprises calculating the difference between the voltage of the first floating diffusion node and the voltage of the second floating diffusion node using a voltage feedback from the CDS amplifier, after the voltage of the second floating diffusion node is stored in the sampling capacitor.

11. The depth sensing method of claim 10, wherein when the calculating calculates the difference between the voltage of the first floating diffusion node and the voltage of the second floating diffusion node, an effect of background light received by the photodiode for the second time period is eliminated.

12. The depth sensing method of claim 7, wherein a difference between the first phase interval and the second phase interval is 180 degrees.

13. A non-transitory computer-readable medium comprising a program for instructing a computer to perform the method of claim 7.

14. A depth camera having a depth sensing apparatus, the camera comprising:
a light emitter to emit light according to a control signal;
a sensor pixel including a photodiode, a first floating diffusion node and a second floating diffusion node;
a controller to reset, to a reference voltage value, a voltage of each of the first floating diffusion node and the second floating diffusion node for a first time period, to control the first floating diffusion node to store a voltage of the photodiode in a first phase interval for a second time period, and to control the second floating diffusion node to store the voltage of the photodiode in a second phase interval for the second time period, wherein a difference between the first phase interval and the second phase interval is 180 degrees, and wherein, for the first time period, the controller resets, to the reference voltage value, the voltage of each of the first floating diffusion node and the second floating diffusion node by shorting an output node of a correlated double sampling (CDS) amplifier of a sensor column from the first floating diffusion node and the second floating diffusion node; and
a calculator, using one or more processors, to calculate the depth value by calculating a difference between the voltage of the first floating diffusion node and the voltage of the second floating diffusion node for a third time period.

15. The depth sensing camera of claim 14, wherein the first period, the second period, and the third period are consecutive and correspond respectively to a reset period, an integration period, and a reduction period.

16. The depth sensing camera of claim 15, wherein after the reduction period is terminated, an output voltage is stored in the first floating diffusion node and the reference voltage value is stored in the second floating diffusion node.

17. A depth sensing method that utilizes one or more processors in a depth sensing camera having a light emitter, a sensor pixel including a photodiode, a first floating diffusion node, a second floating diffusion node, and a controller, the method comprising:
resetting, for a first time period, a voltage of each of the first floating diffusion node and the second floating diffusion node, wherein the resetting comprises resetting, to a reference voltage value, the voltage of each of the first floating diffusion node and the second floating diffusion node by shorting an output node of a correlated double sampling (CDS) amplifier of a sensor column from the first floating diffusion node and the second floating diffusion node for the first time period;
storing a voltage of the photodiode in a first phase interval in the first floating diffusion node for a second time period;
storing the voltage of the photodiode in a second phase interval in the second floating diffusion node for the second time period, wherein a difference between the first phase interval and the second phase interval is 180 degrees;
storing the voltage of the first floating diffusion node in a sampling capacitor for a first portion of a third time period;
transferring the voltage of the first floating diffusion node to a feedback capacitor;
storing the voltage of the second floating diffusion node in the sampling capacitor for a second portion of the third time period; and
calculating, by the processor, a difference between the voltage of the first floating diffusion node and the voltage of the second floating diffusion node for the third time period, thereby eliminating an effect of background light received by the photodiode.

18. The depth sensing method of claim 17, wherein the first period, the second period, and the third period are consecutive and correspond respectively to a reset period, an integration period, and a reduction period.

19. The depth sensing method of claim 18, wherein after the reduction period is terminated, an output voltage is stored in the first floating diffusion node and the reference voltage value is stored in the second floating diffusion node.

20. A depth camera having a depth sensing apparatus, the camera comprising:
a light emitter to emit light according to a control signal;
a sensor pixel including a photodiode, a first floating diffusion node and a second floating diffusion node;
a controller to eliminate distortion of a depth value occurring due to background light by controlling timing of light emitted from the light emitter by way of the control signal to perform active depth sensing and to control the sensor pixel by storing voltages of the photodiode at different phase intervals and at different time periods in the first and second floating diffusion nodes, wherein the different phase intervals are between 0 and 180 degrees or between 90 and 270 degrees, and wherein, for a first time period, the controller resets, to a reference voltage value, the voltage of each of the first floating diffusion node and the second floating diffusion node by shorting an output node of a correlated double sampling (CDS) amplifier of a sensor column from the first floating diffusion node and the second floating diffusion node; and
a calculator, using one or more processors, to calculate the depth value by calculating a difference between a voltage of the first floating diffusion node and a voltage of the second floating diffusion node for a predetermined time period, thereby eliminating an effect of background light received by the photodiode.

* * * * *